T. M. HILL.
Churn.
No. 51,320.  Patented Dec. 5, 1865.
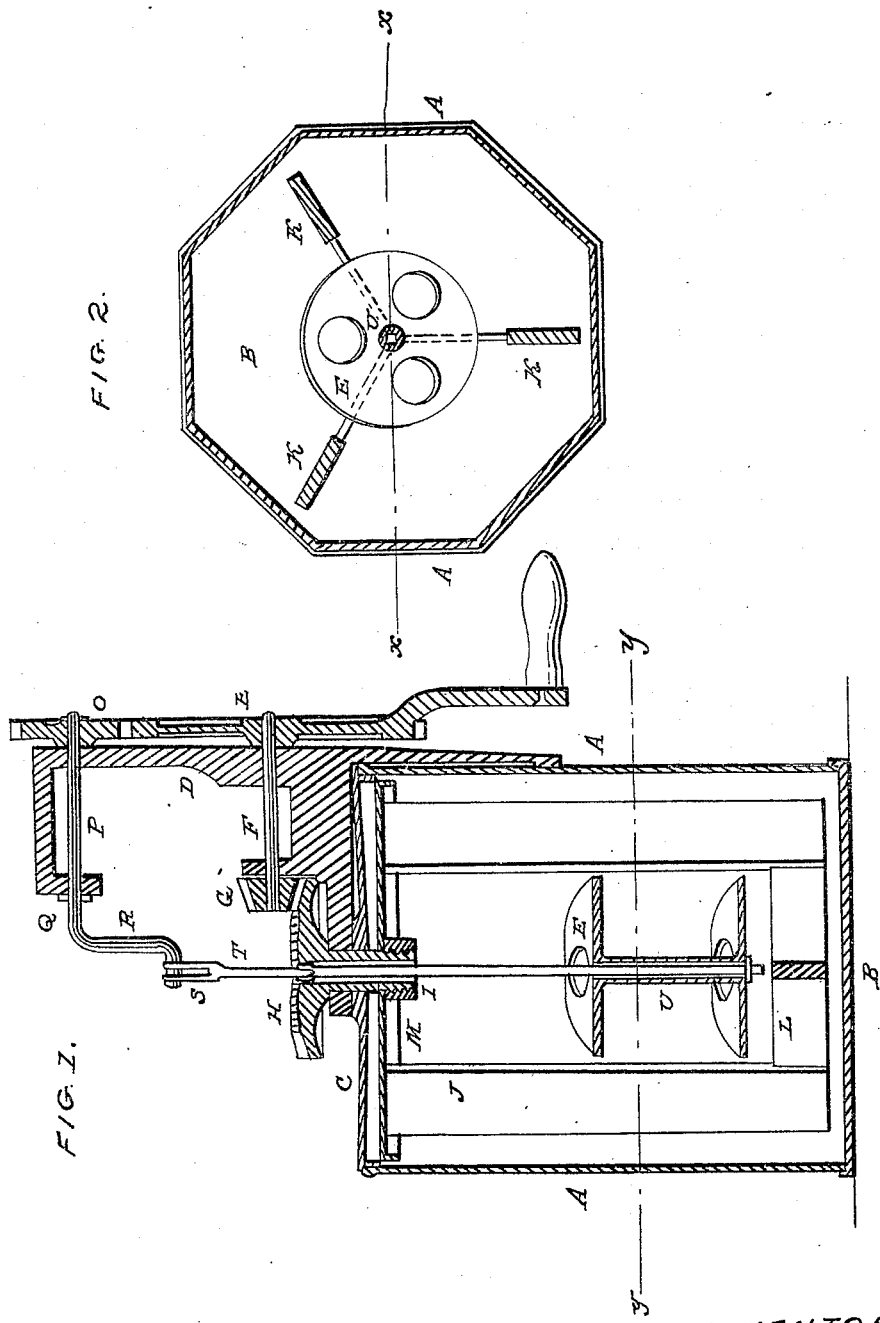
WITNESSES:
INVENTOR.

UNITED STATES PATENT OFFICE.

THOMAS M. HILL, OF EATON, OHIO.

IMPROVEMENT IN CHURNS.

Specification forming part of Letters Patent No. 51,320, dated December 5, 1865.

*To all whom it may concern:*

Be it known that I, THOMAS M. HILL, of Eaton, in the county of Preble and State of Ohio, have made new and useful Improvements in Churns; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a vertical central section on the line $x\, x$, Fig. 2. Fig. 2 is a horizontal section on the line $y\, y$, Fig. 1.

The improvement consists of an exterior horizontally-revolving dasher and an interior vertically-reciprocating dasher acting in conjunction under the impulse derived from the revolution of the driving-wheel.

A A are the octagonal sides of the churn; B, the bottom; C, the lid.

D is a frame supported on the churn and affording bearing for the driving-gear, which consists of a dasher, E, driven by the handle and centered upon a shaft, F, on which is a bevel-pinion, G, whose gears into the bevel-wheel H, whose tubular axis, extending downwardly through the lid of the churn, is screwed into the hub or socket I of the revolving dasher J, which consists of three blades, K K K, united below by the radial arms L and above by the plate M, whose center is the hub I, above spoken of, and whose margin is provided with a depending rim, N.

The gear-wheel E acts as a driver to the smaller wheel O, whose shaft P, being bent after it has passed the inner bearing, Q, forms a crank, R, to which, by a link, S, is hinged a vertical rod, T, which passes through the tubular axis of the wheel H, and to which is attached a dasher, which consists of two perforated disks, U U, united by a tubular stem, through which the dasher-rod passes and below which it is secured.

In the operation of churning, the driving-wheel E being rotated, the blades K are caused to revolve while the double-disk dasher U U plays up and down, crossing and disturbing the vertical direction of the cream generated by the revolving dasher.

When the butter has "come" the central dasher is removed and the butter is gathered by the action of the revolving dasher, and in the intervals of churning the can, deprived of its interior works, is used for a cream-receiver, the rotary dasher being unscrewed so as to free the lid C to act as a cover for the receiver.

I do not claim suspending a dasher in a churn, as that has already been done; but

What I claim as new, and desire to secure by Letters Patent, is—

Suspending the rotary and reciprocating dashers in the churn when combined substantially as described.

THOMAS M. HILL.

Witnesses:
EDWIN DONOHUE,
B. F. LARSH.